United States Patent
Hiraishi

(10) Patent No.: US 9,594,738 B2
(45) Date of Patent: Mar. 14, 2017

(54) DISPLAYING CHANGES RELATED TO PAGES LOCATED BEFORE AND AFTER A CURRENTLY DISPLAYED PAGE

(71) Applicant: CANON KABUSHIKI KAISHA, Tokyo (JP)

(72) Inventor: Tomonobu Hiraishi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 46 days.

(21) Appl. No.: 14/827,864

(22) Filed: Aug. 17, 2015

(65) Prior Publication Data

US 2016/0055137 A1  Feb. 25, 2016

(30) Foreign Application Priority Data

Aug. 19, 2014 (JP) .................. 2014-166345

(51) Int. Cl.
| | |
|---|---|
| G06F 17/24 | (2006.01) |
| G06F 3/0482 | (2013.01) |
| G06F 17/21 | (2006.01) |
| G06F 17/22 | (2006.01) |
| G06F 3/0483 | (2013.01) |

(52) U.S. Cl.
CPC ............ G06F 17/24 (2013.01); G06F 17/217 (2013.01); G06F 17/2288 (2013.01); *G06F 3/0483* (2013.01)

(58) Field of Classification Search
CPC .... G06F 17/24; G06F 17/217; G06F 17/2288; G06F 3/0483
See application file for complete search history.

(56) References Cited

U.S. PATENT DOCUMENTS

2008/0178117 A1* 7/2008 Gelman ................ G06F 3/0481
715/808
2011/0234606 A1* 9/2011 Uyama ............. G06F 17/30058
345/522

FOREIGN PATENT DOCUMENTS

JP  2011186927 A  9/2011

* cited by examiner

*Primary Examiner* — Asher Kells
(74) *Attorney, Agent, or Firm* — Rossi, Kimms & McDowell LLP

(57) ABSTRACT

An information processing apparatus making it possible for a user to easily realize changes in the whole electronic book accompanying an editing operation performed by the user. Changes in the edited electronic book are extracted and displayed on the display unit. The extracted changes are classified into first changes related to pages before a displayed page and second changes related to pages after the displayed page. The changes are caused to be displayed on the page displayed on the display unit such that the changes can be discriminated as any of the first changes or the second changes.

8 Claims, 10 Drawing Sheets

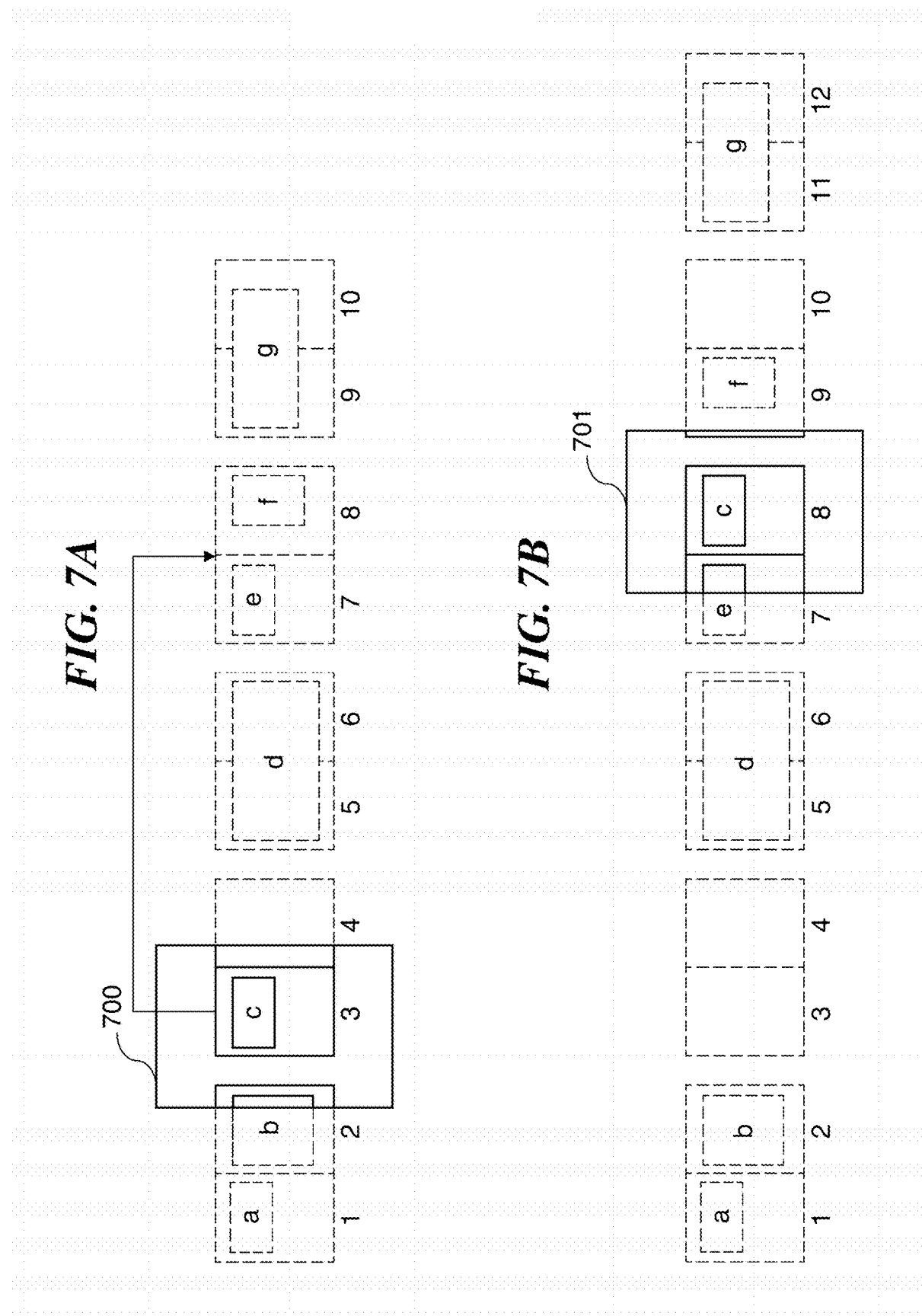

FIG. 8

CHANGE INFORMATION MANAGEMENT TABLE 800

| CHANGE ID [nChangeID] (INTEGER TYPE) 801 | BOOK ID [nBookID] (INTEGER TYPE) 802 | PAGE NUMBER [nPageID] (INTEGER TYPE) 803 | CHANGE DETAILS [oChangeList (*1)] (LIST TYPE) 804 | PAGE POSITION [nPosition (*2)] (INTEGER TYPE) 805 |
|---|---|---|---|---|
| 1 | 100 | 3 | 1 | 0 |
| 2 | 100 | 8 | 0 | |
| 3 | 100 | 9 | 2 | 1 |
| 4 | 100 | 10 | 1,2 | 1 |
| 5 | 100 | 11 | 2 | 1 |
| 6 | 100 | 12 | 2 | 1 |
| ... | ... | ... | ... | ... |

(*1) 0: BEING EDITING TARGET PAGE
1: BLANK PAGE IS INSERTED
2: PAGE MOVES BACKWARD
3: PAGE MOVES FORWARD
...

(*2) 0: FORWARD
1: BACKWARD

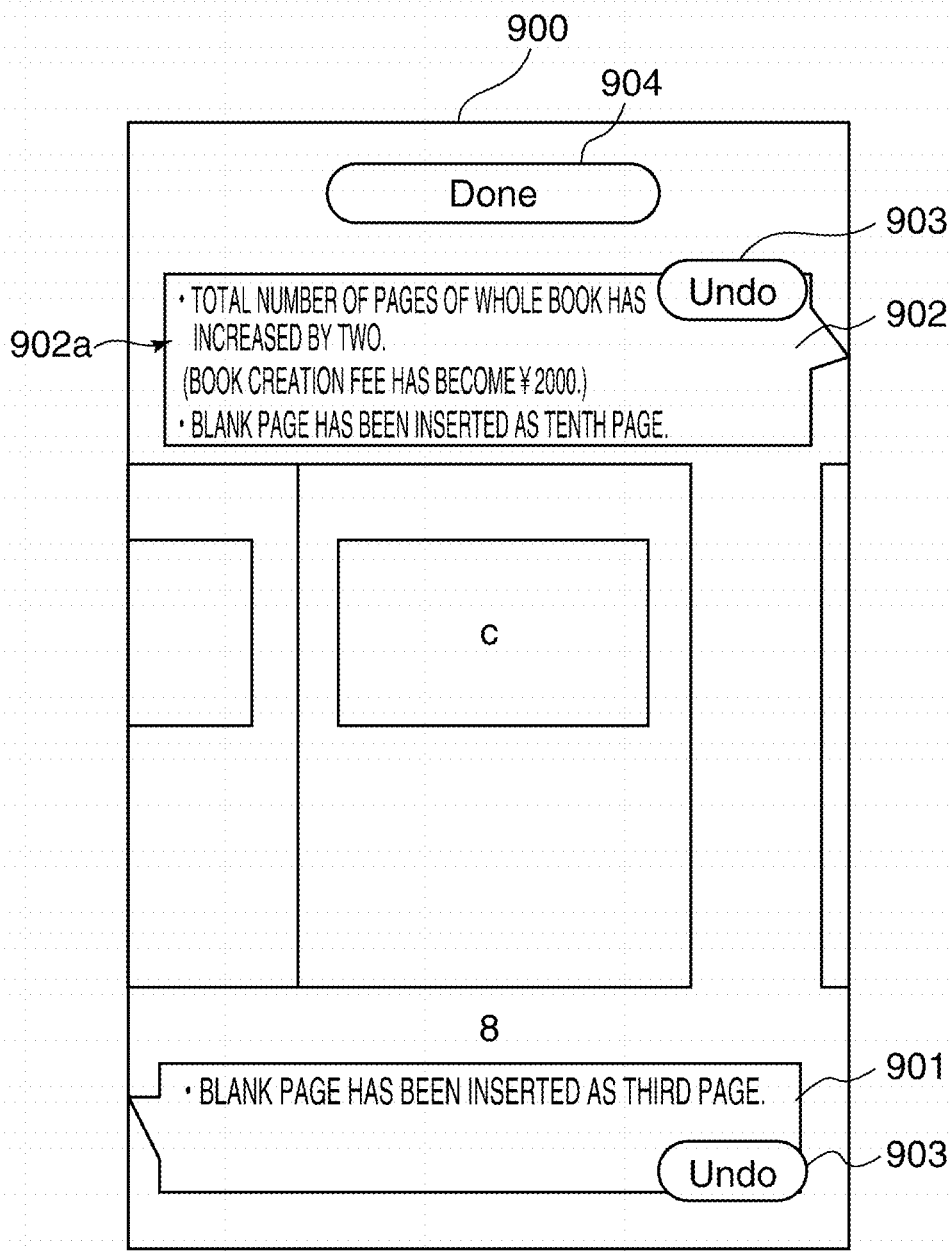

DISPLAYING CHANGES RELATED TO PAGES LOCATED BEFORE AND AFTER A CURRENTLY DISPLAYED PAGE

BACKGROUND OF THE INVENTION

Field of the Invention

The present invention relates to an information processing apparatus, a control method therefor and a storage medium, and more particularly to a control technique at the time of editing an electronic book and the like.

Description of the Related Art

Among recent mobile terminals (information processing apparatuses) such as smartphones and tablet terminals, some are provided with a function for reading an electronic book, which is a digitized book, an electronic book creation function and an electronic book editing function. For example, Japanese Laid-Open Patent Publication (Kokai) No. 2011-186927 proposes an image editing apparatus for arranging selected images in selection order, image-pickup date and time order or file name order to create an electronic book.

In the case of editing an electronic book on a computer, it may happen that, for example, when image layout on a page is changed, or pages are exchanged or deleted, the total number of pages of the electronic book increases or decreases, or layout on other pages is influenced. Therefore, there is a demand for a user interface (UI) making it possible for a user to recognize changes in the whole electronic book made at the time of editing the electronic book at a glance.

However, in a mobile terminal having only a display section with a small screen size, such as a smartphone, it is difficult to display a plurality of pages of an electronic book at the same time in a state that successiveness of the plurality of pages is secured, and page display as shown in FIG. 4 is general. Therefore, if a user performs an editing operation of moving an image on a page of an electronic book to another page to change layout on the information processing apparatus, it is difficult for the user to realize changes in the whole electronic book which occur accompanying the editing operation.

SUMMARY OF THE INVENTION

The present invention provides an information processing apparatus making it possible for a user to easily realize changes in the whole electronic book accompanying an editing operation performed by the user, a control method therefor and a storage medium.

Accordingly, the present invention provides an information processing apparatus comprising an editing unit configured to edit an electronic book, a display unit configured to display a plurality of pages included in the electronic book in order for editing the electronic book by said editing unit, an extraction unit configured to extract changes in the electronic book edited by said editing unit, a display control unit configured to cause said display unit to display the changes extracted by said extraction unit, a classifying unit configured to classify the changes extracted by said extraction unit into first changes related to pages before a page displayed on said display unit and second changes related to pages after the page displayed on said display unit, wherein said display control unit causes the changes to be displayed on the page displayed on said display unit such that the changes can be discriminated as any of the first changes or the second changes.

According to the present invention, changes in an electronic book extracted from book data before and after editing operation is displayed on a screen on which a page of the electronic book is displayed. Thereby, a user can easily realize changes in the whole electronic book accompanying an editing operation performed by the user.

Further features of the present invention will become apparent from the following description of exemplary embodiments (with reference to the attached drawings).

BRIEF DESCRIPTION OF THE DRAWINGS

FIGS. 3A and 3B are diagrams showing examples of a display screen displayed on a display section in the process of FIG. 2, wherein FIG. 3A shows a source selection screen, and FIG. 3B shows an image list screen.

FIGS. 7A and 7B are diagrams for illustrating an electronic book editing operation in the mobile terminal, wherein FIG. 7A shows the electronic book before the editing operation, and FIG. 7B shows the electronic book after the editing operation.

FIG. 8 is a diagram showing an example of a change information management table.

FIG. 9 is a diagram showing an example of the page display screen displayed on the display section after the electronic book editing operation.

DESCRIPTION OF THE EMBODIMENTS

An embodiment of the present invention will be described below in detail with reference to drawings.

Figure 1:
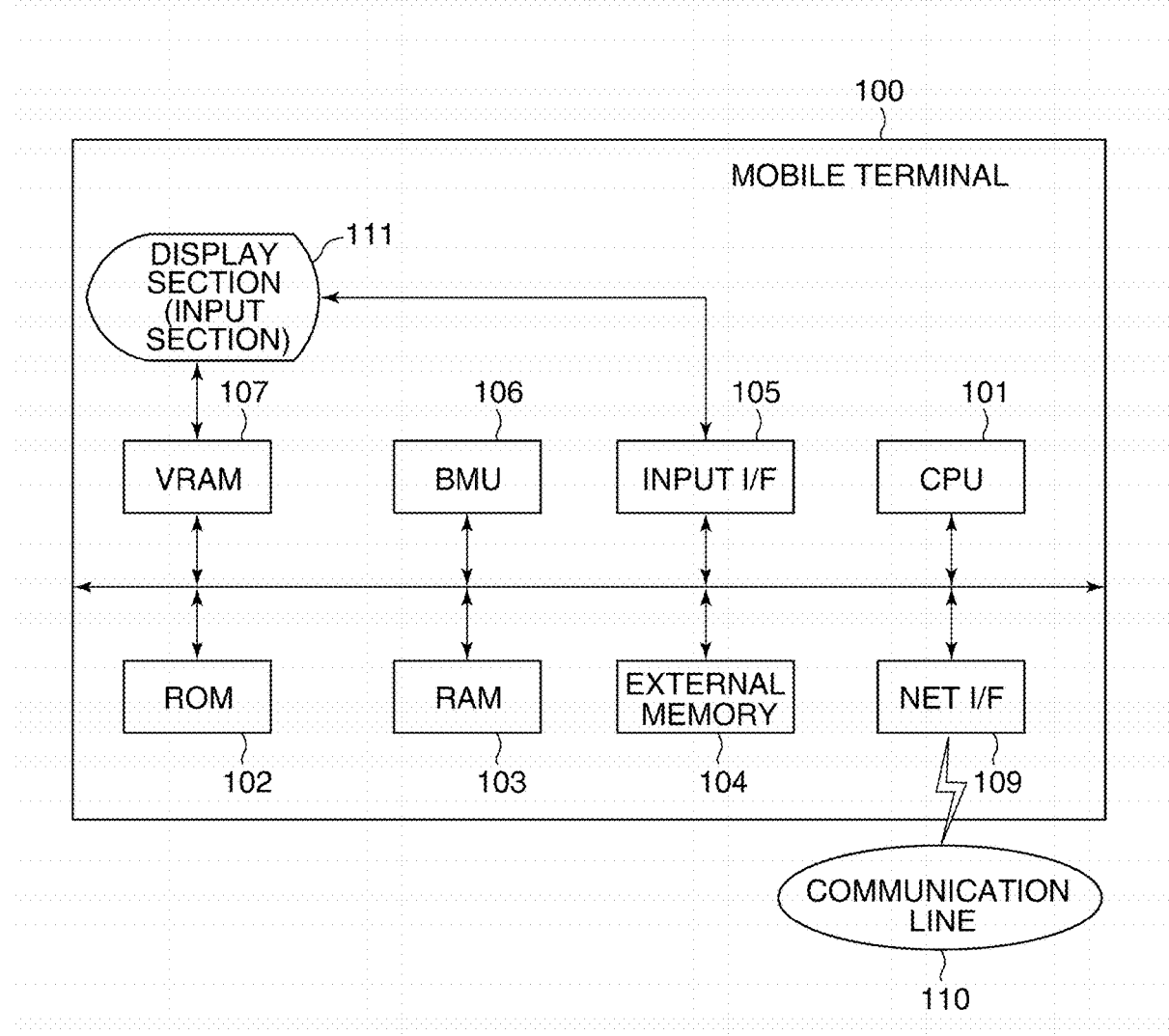
FIG. 1 is a block diagram showing a schematic configuration of a mobile terminal as an information processing apparatus according to an embodiment of the present invention.

FIG. 1 is a block diagram showing a schematic configuration of a mobile terminal as an information processing apparatus according to the embodiment of the present invention.

In FIG. 1, a mobile terminal 100 is an information processing apparatus, for example, a smartphone, a tablet terminal or the like.

The mobile terminal 100 is provided with a CPU 101, a ROM 102, a RAM 103, an external memory 104, an input I/F 105, a BMU 106, a VRAM 107, a NET_I/F 109, a display section 111 and a system bus 112.

The CPU (Central Processing Unit) 101 is connected to the ROM 102, the RAM 103, the external memory 104, the input I/F 105, the BMU 106, the VRAM 107 and the NET_I/F 109 via the system bus 112.

The ROM (Read Only Memory) 102 is a memory which stores programs and various kinds of information which do not require to be changed. The RAM (Random Access Memory) 103 is a memory which temporarily stores a program or data received from a communication line 110 by the NET_I/F 109 and develops a program the CPU 101 reads out from the external memory 104.

The external memory 104 is a nonvolatile memory which stores programs such as an operating system (OS). Further, the external memory 104 stores an image layout application program (hereinafter referred to as an "image layout application") and content such as an image file, a music file, a document file and the like. It should be noted that, if the mobile terminal 100 is provided with a camera function, image data shot by the camera function may be stored in the external memory 104.

The input I/F 105 is an input interface for connecting the touch panel type display section 111, a pointing device and a keyboard which are not shown, and the like. The input I/F 105 receives instruction information on the basis of an operation on the touch panel of the display section 111 and transfers the instruction information to the CPU 101.

The BMU (Bit Move Unit) 106 controls data transfer between memories (for example, between the VRAM 107 and another memory) and between a memory and each I/O device (for example, the NET_I/F 109).

The VRAM (Video RAM) 107 is a memory which temporarily stores image data displayed on the display section 111. The display section 111 is a touch panel type liquid crystal display or the like. The NET_I/F 109 is a communication interface which wirelessly (or wiredly) connects to the communication line 110 such as an external network and a public line.

It should be noted that the mobile terminal 100 may be realized by a single computer or may be realized by a plurality of computers among which various kinds of functions are distributed. If the mobile terminal 100 is realized by a plurality of computers, it is desirable to mutually connect the plurality of computers via a communication line such as a LAN (Local Area Network).

Next, an image layout process for an electronic book in the mobile terminal 100 of FIG. 1 will be described with reference to FIG. 2.

Figure 2:
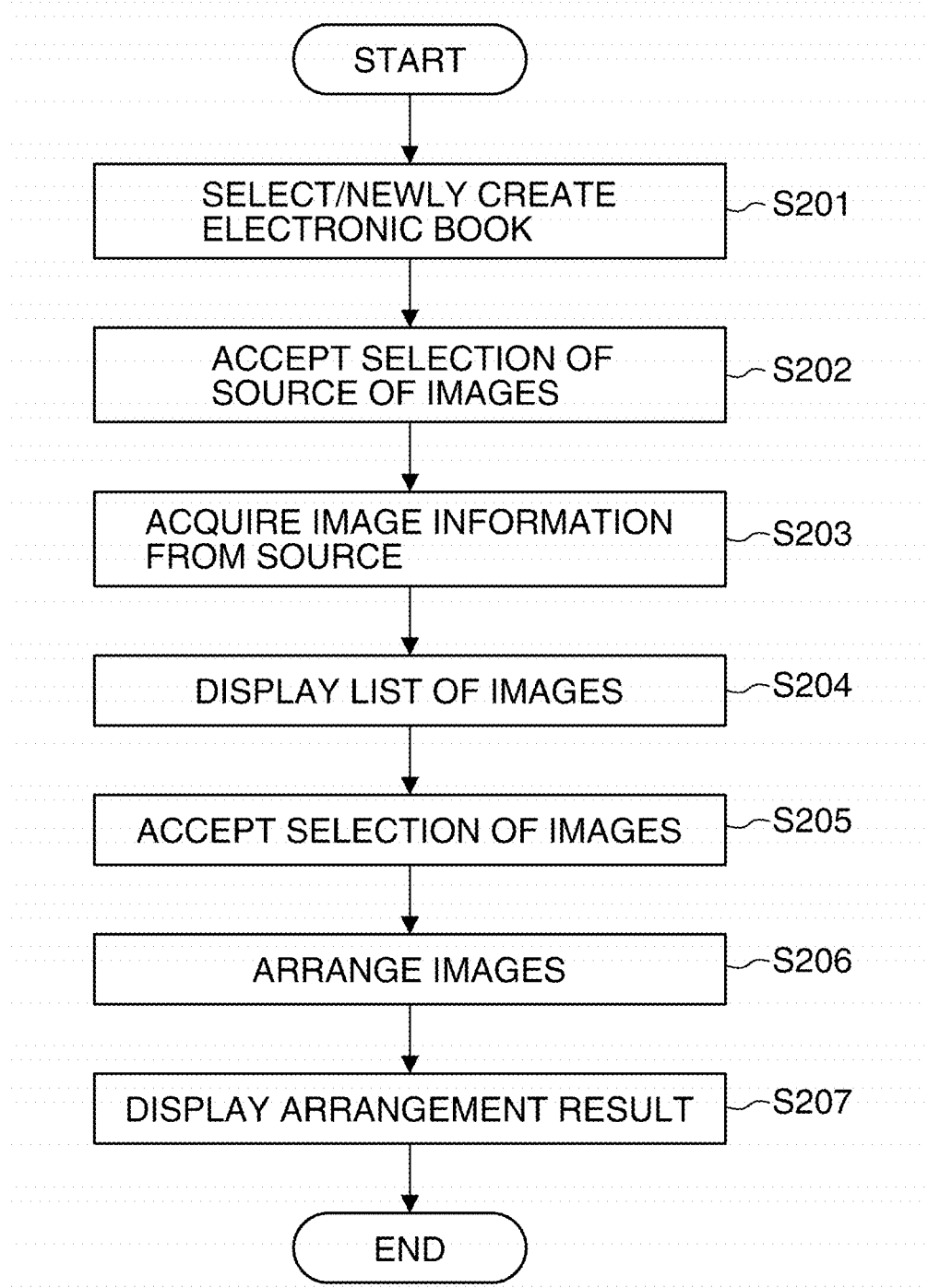
FIG. 2 is a flowchart showing an image layout process for electronic books executed in the mobile terminal of FIG. 1.

FIG. 2 is a flowchart showing the image layout process for an electronic book executed in the mobile terminal 100 of FIG. 1. This process is realized by the CPU 101 reading out the image layout application from the external memory 104 and executing it to control each section in the mobile terminal 100.

First, the CPU 101 reads out data of an electronic book and book data for managing the electronic book (to be described later with reference to FIG. 5) from the external memory 104 on the basis of a book ID of the electronic book selected by a user on the display section 111 (step S201). For example, if a created electronic book is selected, the CPU 101 reads out the data of and book data for the created electronic book from the external memory 104 on the basis of the book ID of the electronic book. On the other hand, if a new electronic book is to be created, the CPU 101 newly generates a book ID and generates data of empty electronic book and empty book data associated with the book ID.

Next, the CPU 101 accepts selection of a source of images to be laid out on pages of the electronic book read out in step S201 (step S202). Specifically, the CPU 101 displays a source selection screen 300 for selecting an image source as shown in FIG. 3A on the display section 111.

Figure 3A:
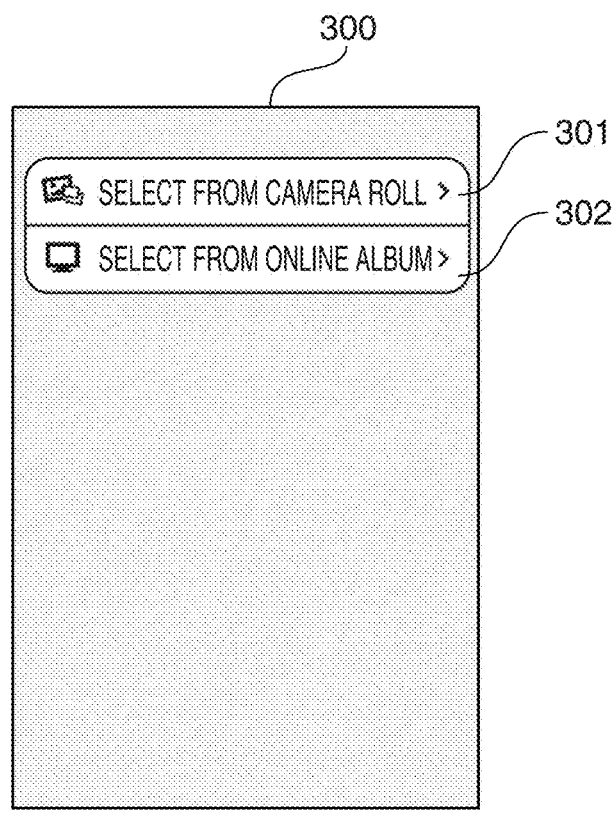

In FIG. 3A, a button 301 for selecting images stored in the external memory 104 is displayed as an image source on the source selection screen 300. Further, on the source selection screen 300, a button 302 for selecting images stored in a storage on the Internet which can be downloaded via the NET_I/F 109 of the mobile terminal 100 is displayed as an image source. When detecting that the user has tapped any of the button 301 and the button 302, the CPU 101 selects a source corresponding to the tapped button.

Returning to FIG. 2, in step S203, the CPU 101 acquires image information from the source selected in step S202. Specifically, when detecting that the button 301 has been tapped by the user, the CPU 101 acquires image information such as thumbnails and filenames of the images stored in the external memory 104. On the other hand, when detecting that the button 302 has been tapped by the user, the CPU 101 accesses the storage (not shown) on the Internet via the NET_I/F 109 and acquires image information such as thumbnails and filenames of the images stored in the storage.

Figure 3B:
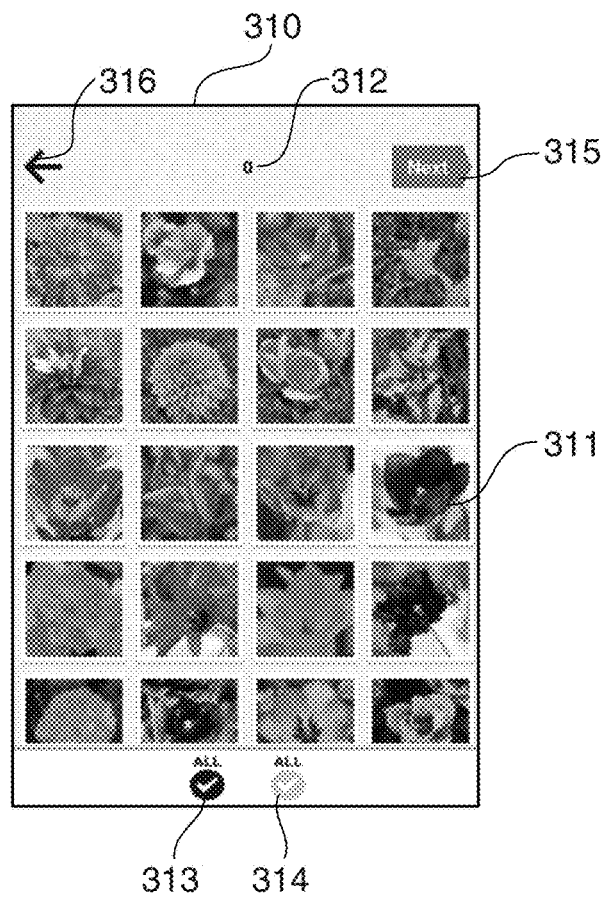

Next, the CPU 101 generates an image list screen 310 as shown in FIG. 3B on the basis of the image information acquired in step S203 and displays the image list screen 310 on the display section 111 (step S204).

In FIG. 3B, thumbnail images 311, the number of selected images 312 are displayed on the image list screen 310. Further, a "select all" button 313 for selecting all the images, a "release all" button 314 for releasing selection of all the images, a "go" button 315 for ending the image selection process, and a "return" button 316 for returning to the source selection screen 300 are displayed. It should be noted that, in order to display as many image thumbnails as possible irrespective of the directions of the images, all the thumbnails are trimmed and displayed in squares with an aspect ratio of 1:1 on the image list screen 310.

Returning to FIG. 2, in step S205, the CPU 101 accepts selection of images from the user. When the selection of the images on the image list screen 310 displayed on the display section 111 is accepted, a checkmark is attached to the selected images so as to understandably display the state that the images have been selected by the user. It should be noted that a method for understandably displaying the state that the images have been selected by the user is not limited to the above method.

Next, when the selection of the images in step S205 ends, the CPU 101 arranges the selected images on pages of the electronic book read out in step S201 in a predetermined method (step S206). At this time, the CPU 101 generates such display data that a plurality of pages of the electronic book can be successively displayed according to the display performance of the display section 111 and creates book data for the electronic book. It should be noted that, though the predetermined method for arranging the images on pages of the electronic book is assumed to be order of selection, the method is not limited to the order of selection.

Figure 4:
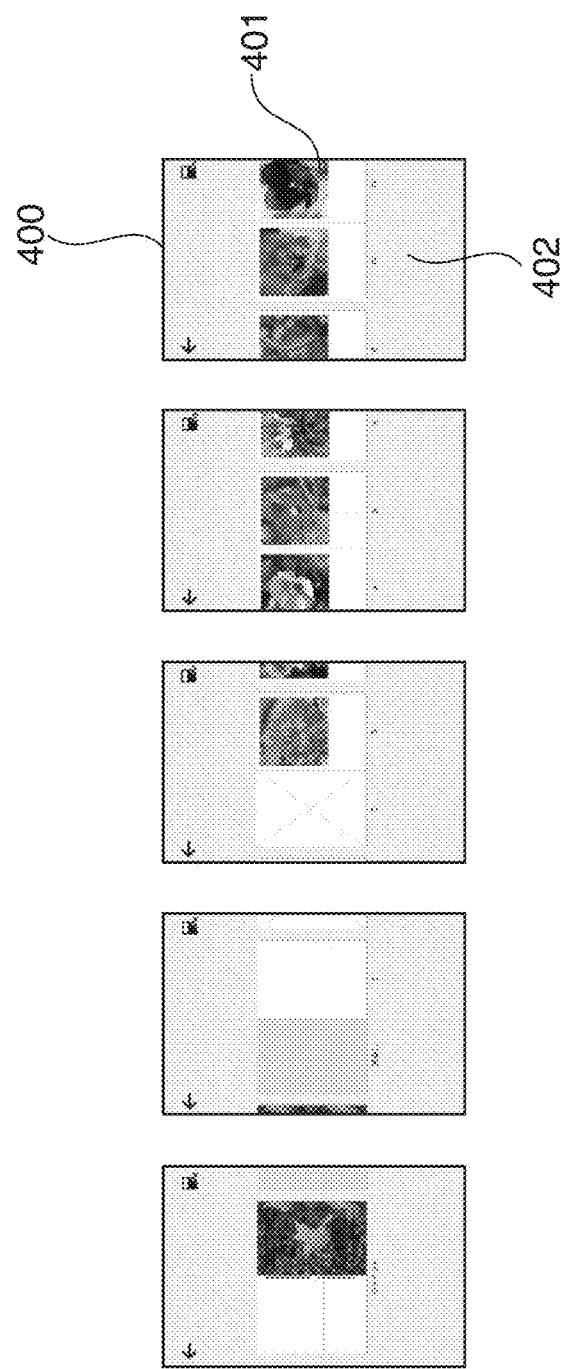
FIG. 4 is a diagram showing an example of a page display screen for an electronic book displayed on the display section.

Next, in step S207, the CPU 101 displays an electronic book page display screen 400 as shown in FIG. 4 on the basis of the display data generated in step S206 and ends the present process.

In FIG. 4, a part of the display data is extracted and displayed on the electronic book page display screen 400 according to the display size of the display area of the display section 111. In response to a scroll operation the user performs on the display section 111, the CPU 101 changes the range of display data displayed on the display area of the display section 111. In FIG. 4, among all pages of the electronic book, on a part of pages 401 corresponding to a scroll position, images are arranged and displayed, and page numbers 402 are also displayed.

Next, book data for managing an electronic book will be described with reference to FIG. 5.

Figure 5:
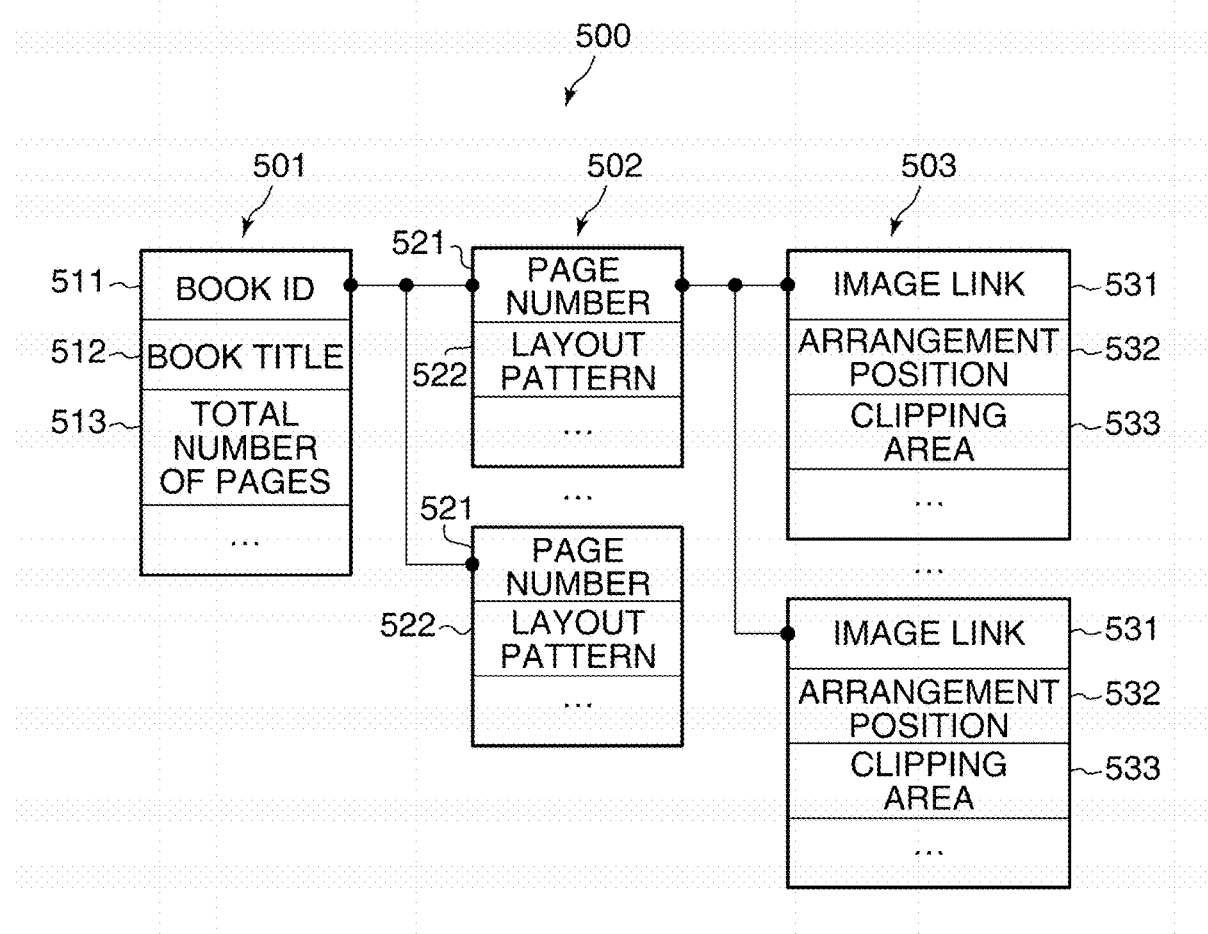
FIG. 5 is a diagram showing a configuration example of book data for managing the electronic book.

FIG. 5 is a diagram showing a configuration example of the book data for managing an electronic book.

Book data 500 is stored in the external memory 104 and has a hierarchical structure constituted by book information 501, page information 502 and image information 503 in that order from the highest layer. Each of the pieces of information includes a link to a lower layer.

The book information 501 includes information about the whole electronic book such as a book ID 511 for uniquely identifying the electronic book, a book title 512 which is a title set for the electronic book and the total number of pages 513 of the electronic book.

The page information 502 includes information about each page of the electronic book such as a page number 521 for uniquely identifying the page and a layout pattern 522 showing the layout of the page.

The image information 503 includes information about each image such as an image link 531 showing a file path to the image laid out on a page, an arrangement position 532 showing the arrangement of the image on the page and a clipping area 533 of the image.

It should be noted that, in the case where an image is laid out over a double spread, the image information 503 is linked with the page information 502 of one page between the pages constituting the double spread.

Next, a process for screen-displaying changes that occur on pages not displayed on the display section 111 at the time of editing a page of an electronic book will be described with reference to FIGS. 6A and 6B.

Figure 6A:
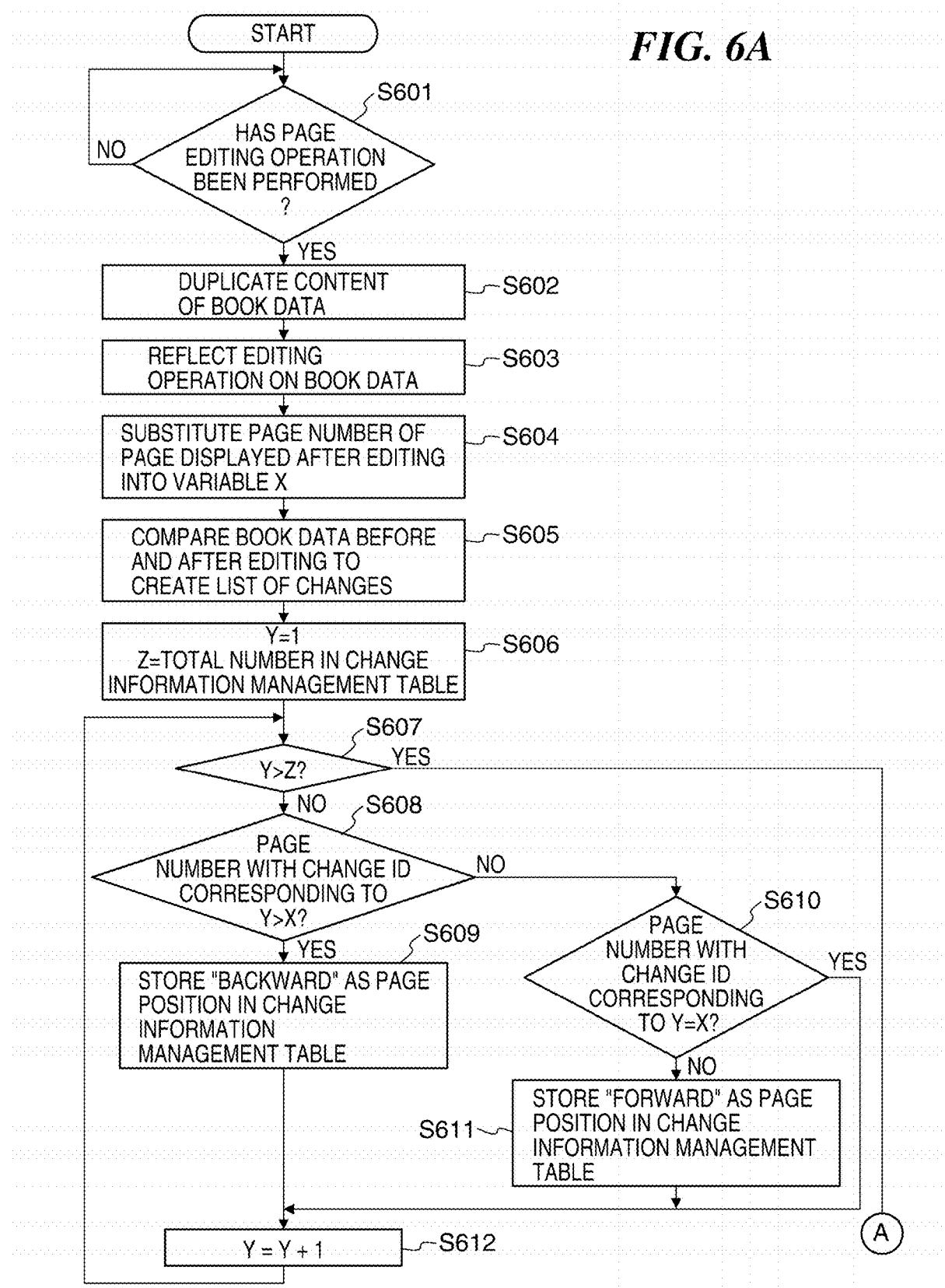
FIGS. 6A and 6B are flowcharts showing a page editing process for electronic books executed in the mobile terminal.
Figure 6B:
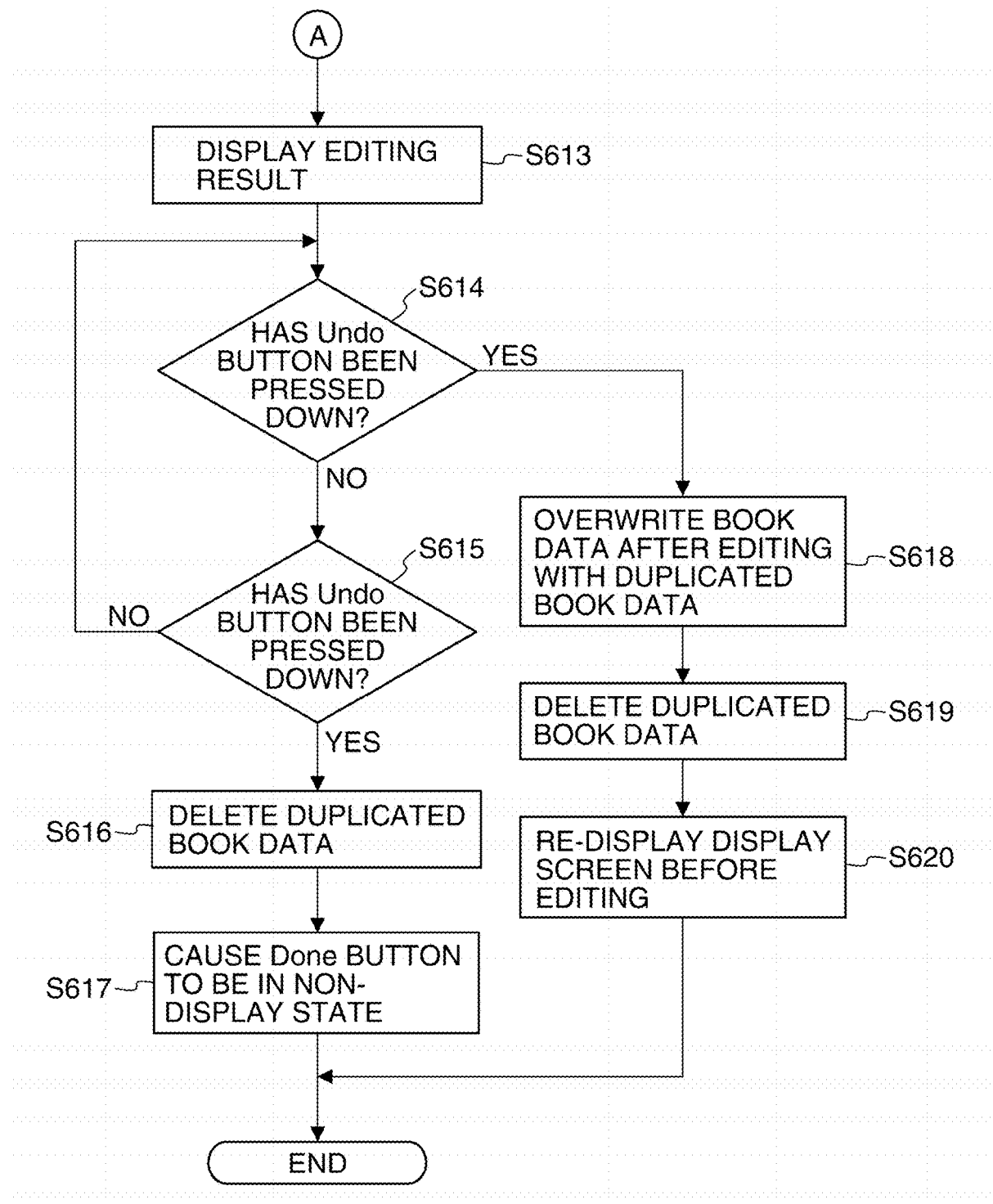

FIGS. 6A and 6B are flowcharts showing a page editing process for electronic books executed in the mobile terminal 100. This process is realized by the CPU 101 reading out the image layout application from the external memory 104 and executing it to control each section in the mobile terminal 100.

In FIG. 6A, the CPU 101 judges whether a page editing operation of an electronic book has been performed or not (step S601). The CPU 101 repeats step S601 until a page editing operation is performed and, if accepting a page editing operation, advances the process to step S602.

In step S602, the CPU 101 duplicates book data 500 for the electronic book for which the editing operation has been accepted in step S601 to create book data 500a and stores the book data 500a into a predetermined storage area in the external memory 104.

Next, the CPU 101 reflects the editing operation accepted in step S601 on the book data 500 and stores the book data 500 into the external memory 104 (step S603). That is, the book data 500 is book data on which the page editing is reflected, and the book data 500a is the (original) book data before the editing.

Here, an example of the electronic book editing operation in the mobile terminal 100 will be described with reference to FIGS. 7A and 7B. It should be noted that, though description will be made on "page movement" as the editing operation in the present embodiment, the editing operation is not limited to "page movement" as far as it is an editing operation for a page of an electronic book. Further, though description will be made on an electronic book in which images are laid out on a double spread in the shown example, the layout is not limited thereto.

In FIGS. 7A and 7B, page display screens 700 and 701 indicate screen displays in the case where the user causes a plurality of double spreads of an electronic book to be successively displayed while scrolling the display section 111. The page display screen 700 is a screen display before an editing operation, and images on pages are displayed on the display section 111 with the third page as the center. On the other hand, the page display screen 701 is a screen display after the editing operation, and images on pages are displayed on the display section 111 with the eighth page as the center.

In FIGS. 7A and 7B, numerals below double spreads indicate page numbers, and frames a to g arranged on the double spreads indicate images.

If the third page is moved to a position between the seventh and eighth pages from the state shown in FIG. 7A, the fourth and succeeding pages originally should move forward by one page so that the third page is filled. However, since an image d is arranged over the fifth and sixth pages, the fourth and succeeding pages cannot be moved forward. Therefore, a blank page is placed as the third page (see FIG. 7B).

By moving the third page, the eighth and succeeding pages move backward by one page. However, since an image g is arranged over the ninth and 10th pages, a blank page is inserted on the tenth page, and the image g is arranged over the eleventh and twelfth pages as in FIG. 7B.

Thus, it is difficult for the user to realize changes that occur on pages (for example, the tenth, eleventh and twelfth pages) far from a page being edited on the page display screen (for example, the third page).

Returning to FIG. 6A, in step S604, the CPU 101 substitutes the page number of a page displayed on the screen after the editing (hereinafter also referred to as an "editing target page") into a variable X (step S604). For example, on the page display screen 701 shown in FIG. 7B, the eighth page after the moving is displayed by page movement. Therefore, the editing target page is the eighth page, and "8" is substituted into the value of the variable X.

Next, the CPU 101 compares the book data before and after the editing operation (the book data 500 and the book data 500a), stores a list of changes for each page into a change information management table 800 shown in FIG. 8 and stores the change information management table 800 into the external memory 104 (step S605).

In FIG. 8, with each change ID 801 as a main key, information of a book ID 802 of an electronic book where a change has occurred, a page number 803 of a page where the change has occurred, change details 804, a page position 805 are managed in the change information management table 800.

As the change ID 801, a numerical value is stored which is generated incrementally from "1" in order of changes extracted from a result of the comparison between the book data for the electronic book before and after the editing. As the book ID 802, the value of the book ID 511 of the book data shown in FIG. 5 is stored. Similarly, as the page number 803, the value of the page number 521 of the book data shown in FIG. 5 is stored.

As the change details 804, what is obtained by converting a change which occurred on a page corresponding to the page number 803 to a numerical value is stored. For example, if the corresponding page is the editing target page, "0" is stored. If a blank page is inserted on the corresponding page, "1" is stored. If the corresponding page moves backward, "2" is stored. Furthermore, if the corresponding page moves forward, "3" is stored. It should be noted that, since a plurality of changes may be applied within the same page, the change details 804 is managed in a list type, and all changes are enumerated. Though a numerical value associated with change details is stored as the change details 804 as shown in FIG. 8, a specific character string may be stored.

Returning to FIG. 6A, in step S606, the CPU 101 substitutes 1 into a variable Y as an initial value, acquires the total number of changes in the change information management table 800, and substitutes the total number into a variable Z.

Next, the CPU 101 compares the variable Y and the variable Z to judge whether the variable Y is larger than the variable Z or not (step S607). If the variable Y is equal to or smaller than the variable Z (step S607: No), the CPU 101 advances the process to step S608. On the other hand, if the variable Y is larger than the variable Z (step S607: Yes), the CPU 101 advances the process to step S613 in FIG. 6B.

In step S608, the CPU 101 extracts a page number corresponding to a change ID with a value equal to the variable Y from the change information management table 800 and compares the extracted page number and the variable X to judge whether the extracted page number is larger than the variable X or not. That is, it is judged whether a changed page is a page before or after the editing target page with the editing target page as a reference and the changes are classified.

If the extracted page number is larger than the variable X (step S608: Yes), the CPU 101 judges that there is a change on a page positioned backward of the editing target page displayed on the page display screen and advances the process to step S609.

In step S609, the CPU 101 stores "1" meaning "backward" as the page position 805 in the change information management table 800 and advances the process to step S612.

On the other hand, if the page number is smaller than the variable X (step S608: No, and step S610: No), the CPU 101 judges that there is a change on a page positioned forward of the editing target page displayed on the page display screen and advances the process to step S611.

In step S611, the CPU 101 stores "0" meaning "forward" as the page position 805 in the change information management table 800 and advances the process to step S612.

On the other hand, if the page number is equal to the variable X (step S608: No, and step S610: Yes), the CPU 101 advances the process to step S612 without storing "0" or "1" as the page position 805 in the change information management table 800.

In step S612, the CPU 101 increments the variable Y and repeats the process in and after step S607. By the process from step S606 to step S612, the information managed in the change information management table 800 can be classified on the basis of whether a change has occurred forward or backward of the editing target page displayed on the page display screen.

In FIG. 6B, in step S613, the CPU 101 performs display control so that changes related to pages positioned forward of the editing target page and changes related to pages positioned backward of the editing page are additionally displayed on the page display screen, using the change information management table 800. An example of the page display screen displayed on the display section 111 after an electronic book editing operation is shown in FIG. 9.

In FIG. 9, an area 901 for displaying changes positioned forward of an editing target page and an area 902 for displaying changes positioned backward of the editing target page are displayed on a page display screen 900.

The area 901 is designed so that a balloon points forward in order that the user can immediately discriminate that a change has occurred at a position forward of the editing target page, and words corresponding to change details of the change which has occurred at the position forward of the editing target page are displayed inside the area 901. The area 902 is designed so that a balloon points backward in order that the user can immediately discriminate that a change has occurred at a position backward of the editing target page, and words corresponding to change details of the change which has occurred at the position backward of the editing target page are displayed inside the area 902. It should be noted that, though a balloon form is adopted as a design enabling the user's immediate discrimination in the screen shown in FIG. 9, the design for the areas 901 and 902 is not limited thereto.

As for change details displayed inside the areas 901 and 902, such a configuration is possible that, when description thereof is not included in a frame, a scroll bar is added to display the whole description, and such a configuration is also possible that, according to the degree of importance of the change details, only limited change details are displayed.

Returning to FIG. 6B, in step S614, the CPU 101 judges whether or not the user has pressed down any of Undo buttons 903 arranged adjacent to the areas 901 and 902 on the page display screen 900 after the changes are displayed (step S614). If judging that any of the Undo button 903 for the area 901 or the Undo button 903 for the area 902 has been pressed down (step S614: Yes), the CPU 101 performs a user's editing canceling process in and after step S618.

In step S618, in order to return the page display screen 900 to the state of the page display screen 700, the CPU 101 reads out the book data 500a duplicated in step S602 in FIG. 6A from the predetermined storage area in the external memory 104 and overwrites the book data 500 after the editing operation with the book data 500a.

Next, the CPU 101 deletes the duplicated book data 500a from the storage area in the external memory 104 (step S619), re-displays the page display screen 700 displayed before the editing operation (step S620) and ends the present process.

On the other hand, if judging that the user has not pressed down the Undo button 903 (step S614: No) but pressed down a Done button 904 (step S615: Yes) in step S614, the CPU 101 advances the process to step S616.

In step S616, the CPU 101 causes the user's editing operation to be decided on and deletes the duplicated book data 500a from the storage area in the external memory 104. Then, the CPU 101 causes the Done button 904 on the page display screen 900 to be in a non-display state (step S617) and ends the present process.

It should be noted that, though editing is decided on in response to the Done button 904 being pressed down in the above process, editing may be automatically decided on, or editing may be decided on, being triggered by start of the next editing. A method for deciding on editing is not limited to the method in the above process.

Further, "Book creation fee has become Y2000" is displayed at a position 902a in the area 902 shown in FIG. 9. Such a configuration is also possible that change in the fee of an electronic book accompanying editing is displayed. By presenting such display, the user can easily realize change in the fee accompanying editing, and it becomes possible to improve convenience of the user.

According to the above embodiment, changes in an electronic book extracted from book data before and after editing operation by a user are displayed on a screen on which a page of the electronic book is displayed. Thereby, the user can easily realize changes in the whole electronic book accompanying an editing operation performed by the user.

Though description has been made on a case where the present invention is applied to a mobile terminal such as a smartphone and a tablet terminal in the above embodiment, an apparatus to which the present invention is applied is not limited thereto. That is, it goes without saying that the advantage of the present invention can be obtained by applying the present invention to any information processing apparatus if the information processing apparatus is such an apparatus that it is difficult to display a plurality of pages at the same time. Further, the kind of an electronic book is not limited to that described above.

Further, though a form of scrolling pages in a horizontal direction has been described in the above embodiment, it goes without saying that a similar advantage can be also obtained in the case of performing scrolling in a vertical direction.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2014-166345, filed Aug. 19, 2014, which is hereby incorporated by reference wherein in its entirety.

What is claimed is:

1. An information processing apparatus comprising:
an editing unit configured to edit an electronic book;
a display control unit configured to control displaying a plurality of pages included in the electronic book on a display unit in order for editing the electronic book by said editing unit;
an extraction unit configured to extract changes in the electronic book edited by said editing unit; and
a classifying unit configured to classify the changes extracted by said extraction unit into first changes related to pages before a page displayed on said display unit and second changes related to pages after the page displayed on said display unit,
wherein said display control unit causes the changes to be displayed on the page displayed on said display unit such that the changes can be discriminated as any of the first changes or the second changes.

2. The information processing apparatus according to claim 1, further comprising a cancel unit configured to accept cancellation of editing of the electronic book after the changes extracted by said extraction unit are displayed.

3. The information processing apparatus according to claim 1, wherein said editing unit rewrites book data for managing the electronic book in response to editing of the electronic book; and
said extraction unit extracts change details and page positions of the changes as the changes by comparing the book data for the electronic book before and after the editing by said editing unit.

4. The information processing apparatus according to claim 1, wherein said display control unit displays the change details of the changes on said display unit.

5. The information processing apparatus according to claim 4, wherein the change details are displayed according to the degree of importance.

6. The information processing apparatus according to claim 4, wherein all the change details are displayed in response to a predetermined operation.

7. A control method for an information processing apparatus comprising an editing unit configured to edit an electronic book and a display unit configured to display a plurality of pages included in the electronic book in order for editing the electronic book by the editing unit, the control method comprising:
an extraction step of extracting changes in the electronic book edited by the editing unit;
a classifying step of classifying the changes extracted in said extraction step into first changes related to pages before a page displayed on the display unit and second changes related to pages after the page displayed on the display unit; and
a display control step of controlling displaying the changes are caused to be displayed on the page displayed on the display unit such that the changes can be discriminated as any of the first changes or the second changes.

8. A computer-readable non-transitory storage medium storing a program for causing a computer to implement a control method for an information processing apparatus comprising an editing unit configured to edit an electronic book and a display unit configured to display a plurality of pages included in the electronic book in order for editing the electronic book by the editing unit, the control method comprising:
an extraction step of extracting changes in the electronic book edited by the editing unit;
a classifying step of classifying the changes extracted in said extraction step into first changes related to pages before a page displayed on the display unit and second changes related to pages after the page displayed on the display unit; and
a display control step of controlling displaying the changes are caused to be displayed on the page displayed on the display unit such that the changes can be discriminated as any of the first changes or the second changes.

* * * * *